US010428797B2

(12) United States Patent
Scott

(10) Patent No.: US 10,428,797 B2
(45) Date of Patent: Oct. 1, 2019

(54) WIND FARM POWER REGULATION

(71) Applicant: INVENTUS HOLDINGS, LLC, Juno Beach, FL (US)

(72) Inventor: Michael Anthony Scott, Palm Beach Gardens, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 0 days.

(21) Appl. No.: 15/642,035

(22) Filed: Jul. 5, 2017

(65) Prior Publication Data

US 2019/0010925 A1   Jan. 10, 2019

(51) Int. Cl.
| | |
|---|---|
| *F03D 7/04* | (2006.01) |
| *F03D 9/25* | (2016.01) |
| *F03D 17/00* | (2016.01) |
| *H02K 7/18* | (2006.01) |
| *F03D 7/02* | (2006.01) |
| *H02J 3/38* | (2006.01) |

(52) U.S. Cl.
CPC .......... *F03D 7/048* (2013.01); *F03D 7/0284* (2013.01); *F03D 7/047* (2013.01); *F03D 9/257* (2017.02); *F03D 17/00* (2016.05); *H02J 3/386* (2013.01); *H02K 7/183* (2013.01); *F05B 2270/1033* (2013.01); *F05B 2270/504* (2013.01)

(58) Field of Classification Search
CPC .......... F03D 7/048; F03D 7/047; F03D 9/257; F03D 17/00
See application file for complete search history.

(56) References Cited

U.S. PATENT DOCUMENTS

| | | | |
|---|---|---|---|
| 7,394,166 B2 | 7/2008 | Teichmann et al. | |
| 7,531,911 B2 | 5/2009 | Rivas et al. | |
| 10,027,118 B2* | 7/2018 | Ubben | H02J 3/18 |
| 2005/0046196 A1* | 3/2005 | Larsen | F03D 9/257 |
| | | | 290/44 |
| 2009/0218817 A1* | 9/2009 | Cardinal | F03D 7/028 |
| | | | 290/44 |
| 2010/0025994 A1* | 2/2010 | Cardinal | F03D 7/0284 |
| | | | 290/44 |
| 2010/0094474 A1* | 4/2010 | Larsen | H02J 3/16 |
| | | | 700/287 |
| 2010/0109447 A1* | 5/2010 | Achilles | F03D 7/0284 |
| | | | 307/153 |

(Continued)

*Primary Examiner* — Sean Gugger
(74) *Attorney, Agent, or Firm* — Tarolli, Sundheim, Covell & Tummino LLP

(57) ABSTRACT

One example includes a wind farm power control system. The system includes a wind farm controller configured to monitor a power characteristic at a high-side of a generator step-up (GSU) transformer. The high-side of the GSU transformer is coupled to a point-of-interconnect (POI) that provides power from the wind farm to a power grid. The system also includes an automatic voltage regulator (AVR) configured to monitor a voltage of a power bus associated with a low-side of the GSU transformer, the power bus being provided power from a plurality of feeder groups. Each of the plurality of feeder groups includes a plurality of wind turbines. The AVR can be further configured to regulate the power characteristic at the high-side of the GSU transformer to within a predetermined range of amplitudes based on the voltage of the power bus.

12 Claims, 6 Drawing Sheets

(56) References Cited

U.S. PATENT DOCUMENTS

| | | | |
|---|---|---|---|
| 2010/0156192 A1* | 6/2010 | Wang | H02J 3/01 307/82 |
| 2012/0203385 A1* | 8/2012 | Kumar | H02J 3/26 700/287 |
| 2015/0137518 A1* | 5/2015 | Yin | F03D 7/0284 290/44 |
| 2015/0369217 A1* | 12/2015 | Gupta | H02J 3/16 290/44 |
| 2016/0245259 A1* | 8/2016 | Gupta | F03D 7/0284 |
| 2016/0308369 A1* | 10/2016 | Gupta | H02J 3/16 |

* cited by examiner

WIND FARM POWER REGULATION

TECHNICAL FIELD

This disclosure relates generally to wind turbine control systems, and more specifically to wind farm power regulation.

BACKGROUND

A wind turbine is a device that converts the wind's kinetic energy into electrical power. Wind turbines are manufactured in a wide range of vertical and horizontal axis types. Arrays of large turbines, known as wind farms or turbine sites are becoming an increasingly large source of clean renewable energy and are used by many countries as part of a strategy to reduce reliance on fossil fuels while reducing pollution and enhancing the environment of our society. As with any type of power supply system, the amount of power that is generated from the wind farm can be regulated to ensure that the power that is provided to a given point-of-interconnect (POI), such as coupled to the power grid, is sufficient to maintain an acceptable performance. For example, there can be standards (e.g., government or industry standards) that can dictate an acceptable range of value for power parameters that are generated by the wind farm.

SUMMARY

One example includes a wind farm power control system. The system includes a wind farm controller configured to monitor a power characteristic at a high-side of a generator step-up (GSU) transformer. The high-side of the GSU transformer is coupled to a point-of-interconnect (POI) that provides power from the wind farm to a power grid. The system also includes an automatic voltage regulator (AVR) configured to monitor a voltage of a power bus associated with a low-side of the GSU transformer, the power bus being provided power from a plurality of feeder groups. Each of the plurality of feeder groups includes a plurality of wind turbines. The AVR can be further configured to regulate the power characteristic at the high-side of the GSU transformer to within a predetermined range of amplitudes based on the voltage of the power bus.

Another example includes a method for regulating power in a wind farm. The method includes monitoring a power characteristic at a high-side of a GSU transformer. The high-side of the GSU transformer being coupled to a POI that provides power from the wind farm to a power grid. The method also includes monitoring a voltage of a power bus associated with a low-side of the GSU transformer. The power bus can be provided power from a voltage output of each of a plurality of feeder groups. Each of the plurality of feeder groups includes a plurality of wind turbines. The method also includes generating a voltage set-point based on the monitored power characteristic. The method also includes providing the voltage set-point to at least one control processor associated with each of the plurality of feeder groups, the at least one control processor being configured to regulate a voltage output associated with the respective one of the plurality of feeder groups. The method further includes setting the voltage output associated with each of the respective plurality of feeder groups to provide the voltage of the power bus to regulate the power characteristic at the high-side of the GSU transformer to within a predetermined range of amplitudes based on the voltage set-point.

Another example includes a wind farm power control system. The system includes a wind farm controller configured to monitor a power characteristic at a high-side of a GSU transformer. The high-side of the GSU transformer can be coupled to a point-of-interconnect (POI) that provides power from the wind farm to a power grid. The system also includes a plurality of breaker switches configured to interconnect a respective plurality of feeder groups to a power bus associated with a low-side of the GSU transformer, each of the plurality of feeder groups comprising a plurality of wind turbines. The system further includes an AVR configured to monitor a voltage of the power bus that is provided power from the plurality of feeder groups, the AVR being further configured to generate a voltage set-point based on the voltage of the power bus and based on a number of the plurality of feeder groups that are coupled to the power bus via a respective number of the plurality of breaker switches, and to regulate the power characteristic at the high-side of the GSU transformer to within a predetermined range of amplitudes based on the voltage set-point.

DETAILED DESCRIPTION

This disclosure relates generally to wind turbine control systems, and more specifically to wind farm power regulation. In a given wind farm, a wind farm power control system can regulate a power characteristic based on regulating individual feeder groups of wind turbines. As an example, the wind turbines of a wind farm can be assigned to separate feeder groups, such as corresponding to different customer requirements. As a result, the feeder groups can be controlled in a segmented curtailment manner, such that some of the feeder groups can be selectively curtailed to accommodate customer demands. The power control system can be configured to monitor a power characteristic (e.g., volt-ampere reactive power (var)) at the high-side of a generator step-up (GSU) transformer. The GSU transformer can generate an output voltage at the high-side, and can thus correspond to the point of interconnect (POI), such as coupled to a power grid to supply power to a community or region. As an example, the output voltage at the high-side of the GSU transformer can be defined within a tolerance of a predetermined specification, such as defined by a voltage schedule, such as issued by a Transmission Operator (TO) to a Generator Operator (GO).

In response to monitoring the power characteristic, the power control system can regulate the wind turbines in the feeder groups in a voltage control mode. Particularly, a wind farm controller can be programmed to selectively control a voltage output set-point of each of the feeder groups that provide power on a bus that is coupled to the low-side of the GSU transformer. As a result, the wind farm controller can maintain the voltage of the wind farm at the high-side of the GSU transformer to within the predetermined specification by monitoring the power characteristic at the high-side of the GSU transformer and selectively controlling the power output of the feeder groups of each of the feeder groups that have not been selectively curtailed, and thus the voltage at the low-side of the transformer.

Figure 1:
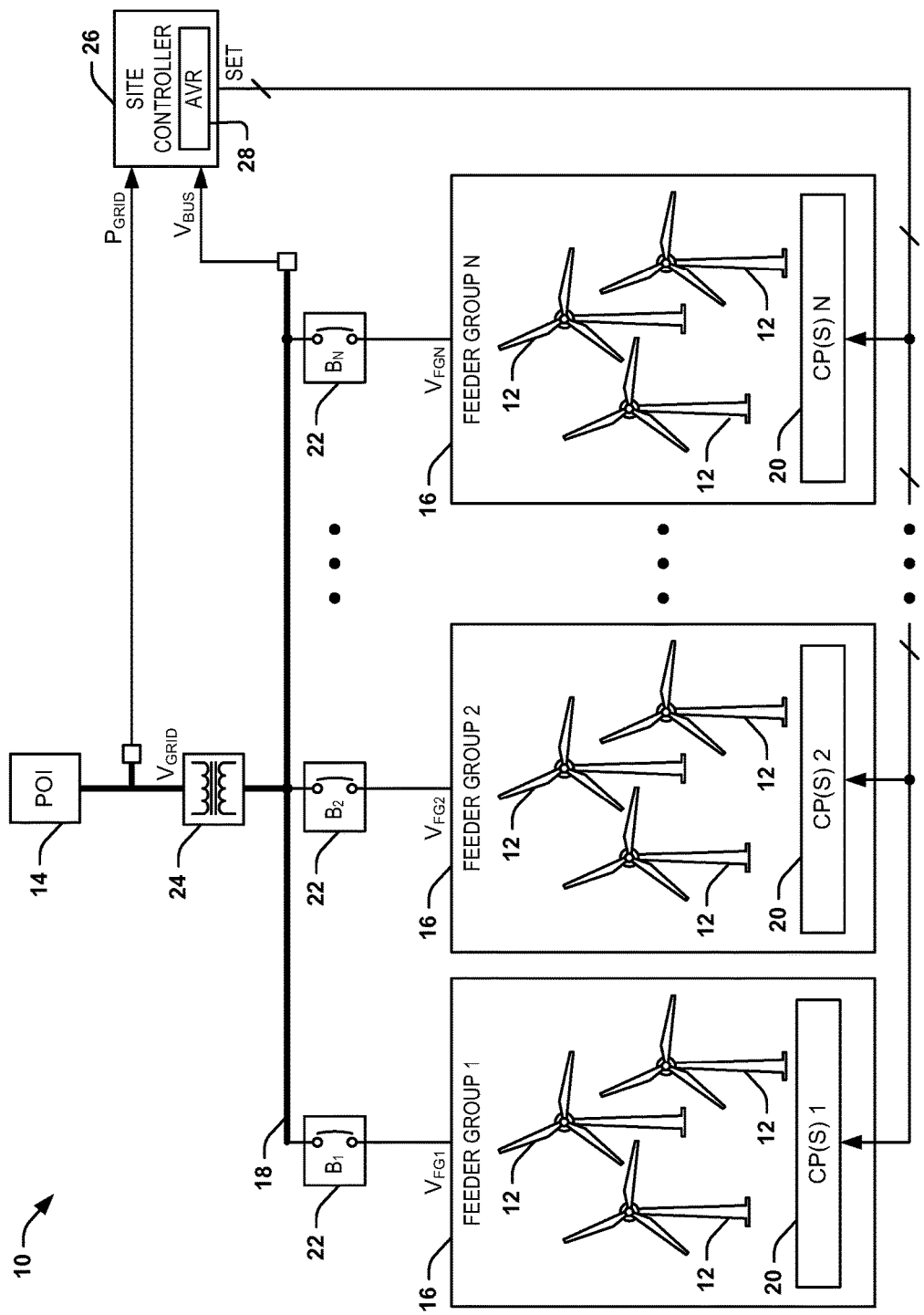
FIG. 1 illustrates a first example of a wind farm power control system.

FIG. 1 illustrates an example of a wind farm power control system 10. The wind farm power control system 10 can be implemented in any of a variety of wind power applications of a wind farm, with the wind farm including a plurality of wind turbines 12. Each of the wind turbines 12 can be configured to generate electrical power, such as to provide power to a public power grid via a point-of-interconnect (POI) 14.

In the example of FIG. 1, the wind turbines 12 are organized into a plurality N of feeder groups 16 that collectively provide power onto a power bus 18, where N is a positive integer greater than one. Each of the feeder groups 16 includes at least one control processor ("CP") 20 that is configured to control the respective feeder group 16 to provide a respective voltage, demonstrated as voltages $V_{FG1}$ through $V_{FGN}$. As an example, the control processor(s) 20 can be configured as microprocessor(s), programmable logic controller(s) (PLCs), or any of a variety of other types of control systems. In the example of FIG. 1, each of the feeder groups 16 are coupled to the power bus 18 via a respective plurality of breaker switches 22, demonstrated in the example of FIG. 1 as $B_1$ through $B_N$. The breaker switches 22 can be configured to provide circuit protection, such as to forcibly open in response to excess voltage and/or current. Additionally, the breaker switches 22 can be selectively opened to provide selective curtailment of the feeder groups 16. For example, the feeder groups 16 can be organized by specific regions, customers, or other types of organization, such that a given feeder group 16 can be deactivated based on curtailing the wind turbines 12, such as by pitching the blades of the wind turbines 12 to shed the output power. As another example, the feeder groups can be deactivated based on a selective opening of a respective one of the breaker switches 22 to prohibit contribution of the feeder group 16 in providing power to the power bus 18 via the respective one of the voltage(s) $V_{FG1}$ through $V_{FGN}$.

The power bus 18 is coupled to a low-side of a generator step-up (GSU) transformer 24. In the example of FIG. 1, the power bus 18 is demonstrated as having a voltage $V_{BUS}$, such that the GSU transformer 24 is configured to transform the voltage $V_{BUS}$ to a voltage $V_{GRID}$ at a high-side of the GSU transformer 24 that is coupled to the POI 14. Therefore, power $P_{GRID}$ is provided as a power source to power customers of the wind farm via the POI 14. However, as described herein, the wind farm power control system 10 can be configured to regulate the power $P_{GRID}$. As described herein, the power $P_{GRID}$ is representative of a power characteristic of the high-side of the GSU transformer 24, and thus the POI 14. The power $P_{GRID}$ is therefore demonstrated as a "power characteristic" of the POI 14, which can thus correspond to any of a variety of measurable power parameters, such as voltage, current, reactive power, or a variety of other power characteristics. As an example, a voltage schedule, such as issued by a Transmission Operator (TO) to a Generator Operator (GO), can define a range of acceptable values of one or more of the power characteristics represented by the power $P_{GRID}$ at the POI 14, such as based on a number of parameters of the associated power grid.

In the example of FIG. 1, the wind farm power control system 10 includes a site controller 26 that is configured to implement the power control methodology described herein. As an example, the site controller 26 can be configured as or as part of a wind farm controller to control any/all portions of the wind farm. For example, the site controller 26 can correspond to a remote terminal unit (RTU), or can correspond to one of the control processor(s) 20 (e.g., a master control processor). In the example of FIG. 1, the site controller 26 is coupled to the POI 14 and the power bus 18, and is thus configured to monitor the power $P_{GRID}$ and the voltage $V_{BUS}$. As described herein, the monitoring of the power $P_{GRID}$ can be associated with monitoring one or more power characteristics, such as including reactive power (e.g., in Mega-var, or "Mvar"). Additionally, the site controller 26 includes an automatic voltage regulator (AVR) 28. Based on the monitoring of the power $P_{GRID}$ and the voltage $V_{BUS}$, the AVR 28 is configured to generate at least one voltage, power factor, or phase angle set-point, and to provide the set-point(s), demonstrated in the example of FIG. 1 as signals SET, to the control processor(s) 20 in each of the feeder groups 16. Therefore, each of the control processor(s) 20 can control the wind turbines 12 in a given one of the feeder groups 16 to provide a requisite predetermined voltage $V_{FG}$, such that the feeder groups 16 can cooperate to generate the voltage $V_{BUS}$ at the low-side of the GSU transformer 24 to regulate the power $P_{GRID}$, or any of the associated power characteristics, to within an acceptable range of values dictated by the standard.

For example, the AVR 28 can be configured to determine which of the feeder groups 16 are selectively coupled to the power bus 18 via the respective breaker switches 22. The AVR 28 can thus be configured to implement an algorithm to calculate the voltage set-point SET based on the number of the feeder groups 16 that are coupled to the power bus 18 (via closed breaker switches 22), characteristics associated with the respective feeder groups 16 (e.g., the number and characteristics of the wind turbines 12 in the feeder groups 16), and the amplitude of the voltage $V_{BUS}$ with respect to the amplitude of the power characteristics associated with the power $P_{GRID}$. For example, the voltage set-point SET can be provided to implement voltage mode control of the feeder groups 16 to provide an appropriate amplitude of the respective voltages $V_{FG}$ to provide a sufficient amplitude of the voltage $V_{BUS}$ to maintain the power characteristic associated with the power $P_{GRID}$ to within the predetermined range of amplitudes, such as dictated by the standard.

Figure 2:
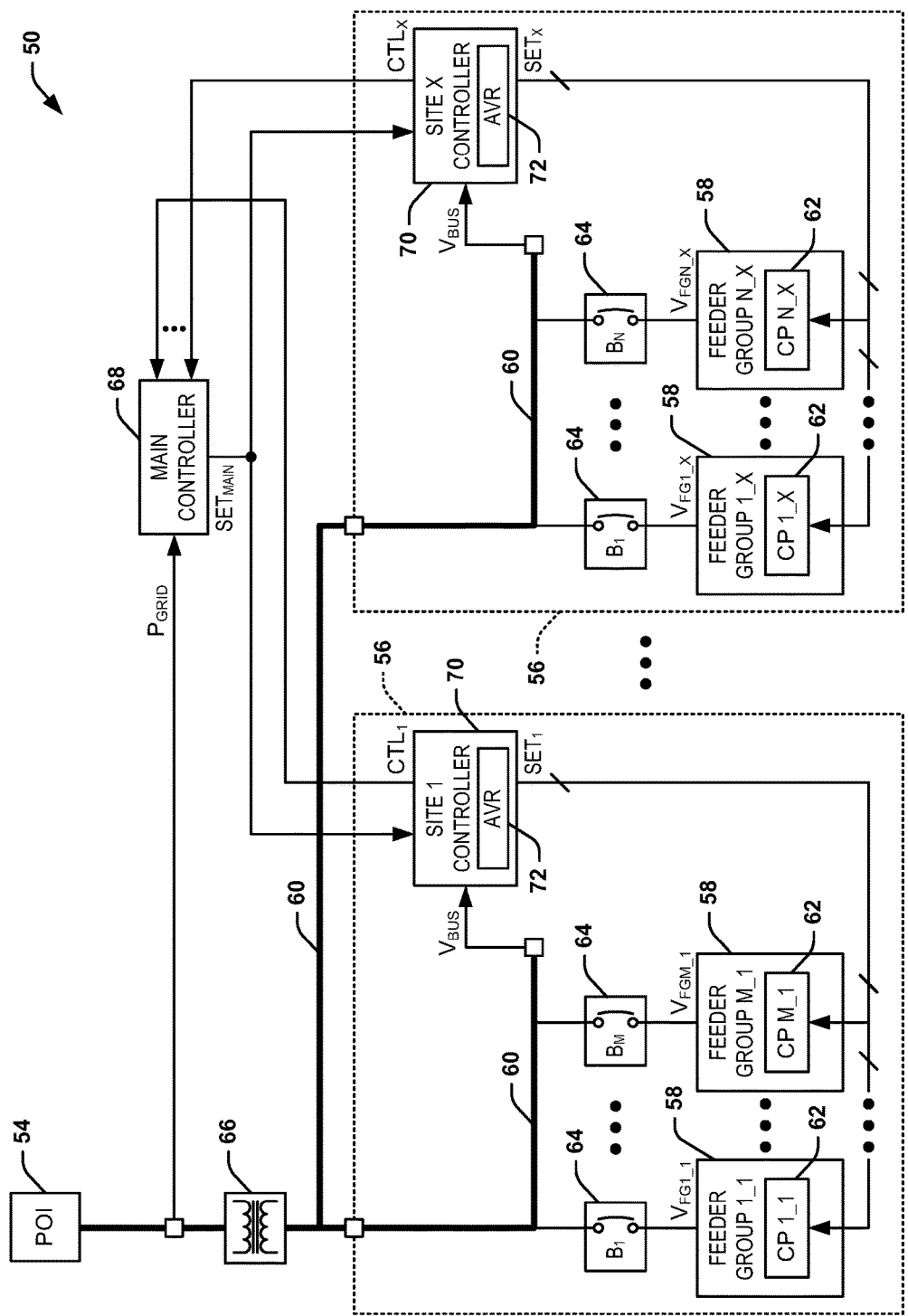
FIG. 2 illustrates a second example of a wind farm power control system.

FIG. 2 illustrates a second example of a wind farm power control system 50. The wind farm power control system 50 includes a plurality of wind turbines. Each of the wind turbines can be configured to generate electrical power, such as to provide power to a public power grid via a POI 54.

In the example of FIG. 2, the wind farm power control system 50 includes a plurality X of wind farms, where X is a positive integer greater than one. Each of the wind farms 56 can be configured substantially similar to the wind farm in the wind farm power control system 10 in the example of FIG. 1. In each of the wind farms 56, the wind turbines are organized into a plurality of feeder groups 58 that collectively provide power onto a power bus 60 that is associated with all of the wind farms 56. In the example of FIG. 2, the wind farms 56 can vary in composition of wind turbines and feeder groups 58 relative to each other, such that a first wind farm 56 includes M feeder groups 58 and the $X^{th}$ wind farm 56 includes N feeder groups, where M and N are positive integers greater than one and not necessarily equal with respect to each other.

In each of the wind farms 56, each of the feeder groups 58 includes at least one control processor 62 that is configured to control the respective feeder group 58 to provide a respective voltage $V_{FG}$, demonstrated as $V_{FG1\_1}$ through $V_{FGM\_1}$ in the first wind farm 56 and $V_{FG1\_X}$ through $V_{FGN\_X}$ in the $X^{th}$ feeder group 58. In the example of FIG. 2, each of the feeder groups 58 are coupled to the power bus 60 via a respective plurality of breaker switches 64. The breaker switches 64 can be configured to provide circuit protection, such as to forcibly open in response to excess voltage and/or current, and can be selectively deactivated to provide selective curtailment of the feeder groups 58 in each of the wind farms 56, similar to as described previously.

The power bus 60 is coupled to a low-side of a GSU transformer 66. In the example of FIG. 2, the power bus 60 is demonstrated as having a voltage $V_{BUD}$, such that the GSU transformer 66 is configured to transform the voltage $V_{BUS}$ to a power $P_{GRID}$ at a high-side of the GSU transformer 66 that is coupled to the POI 54. Therefore, the power $P_{GRID}$ is provided as a power source to power customers of the wind farm via the POI 54. Similar to as described previously, the wind farm power control system 50 can be configured to regulate the power $P_{GRID}$. As described herein, the power $P_{GRID}$ is representative of a power characteristic of the high-side of the GSU transformer 66, and thus the POI 54.

In the example of FIG. 2, the wind farm power control system 50 includes a main controller 68 and a plurality of site controllers 70 that are each associated with a respective one of the wind farms 56. The main controller 68 is configured to cooperate with the site controllers 70 to implement the power control methodology described herein. For example, the main controller 68 can correspond to an RTU, or can correspond to one of the control processor(s) 62 (e.g., a master control processor). Similarly, the site controllers 68 can each be configured as RTUs, or as one of the control processor(s) 62. In the example of FIG. 2, the main controller 68 is coupled to the POI 54, and is thus configured to monitor the power $P_{GRID}$, while the site controllers 70 are each configured to monitor the voltage $V_{BUS}$ of the power bus 60. The site controllers 70 are also each configured to provide respective control signals, demonstrated as $CTL_1$ through $CTL_X$, to the main controller 68 that can correspond to an amplitude of the voltage $V_{BUS}$, and/or can include characteristics of the wind farm 56. For example, the characteristics of the wind farm 56 can include an indication of how many feeder groups 58 are selectively coupled to the power bus 60 via the respective breaker switches 64 and/or the number of wind turbines in the respective feeder groups 58.

In response to the monitoring of the power $P_{GRID}$ and the control signals $CTL_1$ through $CTL_X$, the main controller 68 can be configured to generate a main voltage set-point $SET_{MAIN}$ that is provided to each of the site controllers 70. The main voltage set-point $SET_{MAIN}$ can be associated with a desired amplitude of the voltage $V_{BUS}$ associated with the power bus 60 to maintain the power $P_{GRID}$ to within the predetermined range of amplitudes. In the example of FIG. 2, each of the site controllers 70 includes an AVR 72. Based on the main voltage set-point $SET_{MAIN}$ and the voltage $V_{BUS}$, the AVR 72 is configured to generate at least one voltage set-point SET, and to provide the voltage set-point(s) SET to the control processor(s) 62 in each of the feeder groups 58. Therefore, each of the control processor(s) 62 can control the wind turbines in a given one of the feeder groups 58 to provide a requisite predetermined voltage $V_{FG}$, such that the feeder groups 58 in each of the wind farms 56 can cooperate to generate the voltage $V_{BUS}$ at the low-side of the GSU transformer 66 to regulate the power $P_{GRID}$, or any of the associated power characteristics, to within an acceptable range of values dictated by the standard.

For example, the AVR 72 can be configured to determine which of the feeder groups 58 are selectively coupled to the power bus 60 via the respective breaker switches 64. The AVR 72 can thus be configured to implement an algorithm to calculate the voltage set-point SET based on the number of the feeder groups 58 that are coupled to the power bus 60 (via closed breaker switches 64), characteristics associated with the respective feeder groups 58 (e.g., the number and characteristics of the wind turbines in the feeder groups 58), and the amplitude of the voltage $V_{BUS}$ relative to the main voltage set-point $SET_{MAIN}$. For example, the voltage set-point SET can be provided to implement voltage mode control of the feeder groups 58 to provide an appropriate amplitude of the respective voltages $V_{FG}$ to provide a sufficient amplitude of the voltage $V_{BUS}$ to maintain the power characteristic associated with the power $P_{GRID}$ to within the predetermined range of amplitudes, such as dictated by the main voltage set-point $SET_{MAIN}$.

Figure 3:
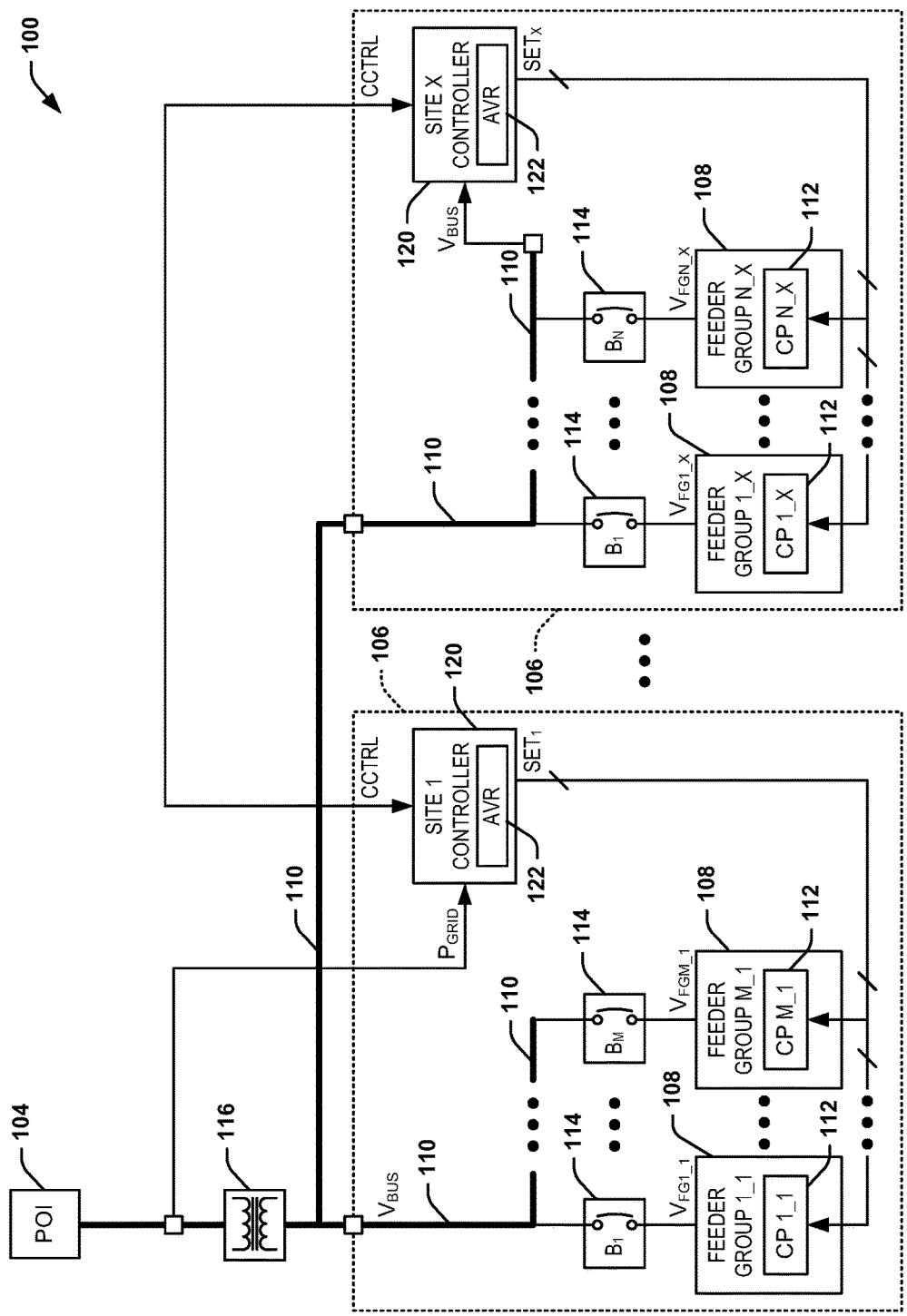
FIG. 3 illustrates a third example of a wind farm power control system.

FIG. 3 illustrates a third example of a wind farm power control system 100. The wind farm power control system 100 includes a plurality of wind turbines. Each of the wind turbines can be configured to generate wind power, such as to provide power to a public power grid via a POI 104.

In the example of FIG. 3, the wind farm power control system 100 includes a plurality X of wind farms 106, where X is a positive integer greater than one. Each of the wind farms 106 can be configured substantially similar to the wind farm in the wind farm power control system 10 in the example of FIG. 1. In each of the wind farms 106, the wind turbines are organized into a plurality of feeder groups 108 that collectively provide power onto a power bus 110 that is associated with all of the wind farms 106. In the example of FIG. 3, the wind farms 106 can vary in composition of wind turbines and feeder groups 108 relative to each other, such that a first wind farm 106 includes M feeder groups 108 and the $X^{th}$ wind farm 106 includes N feeder groups, where M and N are positive integers greater than one and not necessarily equal with respect to each other.

In each of the wind farms 106, each of the feeder groups 108 includes at least one control processor 112 that is configured to control the respective feeder group 108 to provide a respective voltage $V_{FG}$, demonstrated as $V_{FG1\_1}$ through $V_{FGM\_1}$ in the first wind farm 106 and $V_{FG1\_X}$ through $V_{FGN\_X}$ in the $X^{th}$ feeder group 108. In the example of FIG. 3, each of the feeder groups 108 are coupled to the power bus 110 via a respective plurality of breaker switches 114. The breaker switches 114 can be configured to provide circuit protection, such as to forcibly open in response to excess voltage and/or current.

The power bus 110 is coupled to a low-side of a GSU transformer 116. In the example of FIG. 3, the power bus 110 is demonstrated as having a voltage $V_{BUS}$, such that the GSU transformer 116 is configured to transform the voltage $V_{BUS}$ to a power $P_{GRID}$ at a high-side of the GSU transformer 116 that is coupled to the POI 104. Therefore, the power $P_{GRID}$ is provided as a power source to power customers of the wind farm via the POI 104. Similar to as described previously, the wind farm power control system 100 can be configured to regulate the power $P_{GRID}$. As described herein, the power $P_{GRID}$ is representative of a power characteristic of the high-side of the GSU transformer 116, and thus the POI 104.

In the example of FIG. 3, the wind farm power control system 100 includes a plurality of site controllers 120 that are each associated with a respective one of the wind farms 106. The site controllers 120 are configured to cooperatively implement the power control methodology described herein. For example, the site controllers 120 can each be configured as RTUs, or as one of the control processor(s) 112. In the example of FIG. 3, at least one of the site controllers 120, demonstrated as at least the first site controller 120, associated with a respective at least one of the wind farms 106 is coupled to the POI 104, and is thus configured to monitor the power $P_{GRID}$. Additionally, the site controllers 120 associated with the remaining wind farm(s) 120 are each configured to monitor the voltage $V_{BUS}$ of the power bus 110.

The site controller(s) 120 are demonstrated as being configured to generate a cross-control signal CCTRL that is provided to each of the other site controller(s) 120. The cross-control signal CCTRL can be provided from the site controller(s) 120 that are monitoring the power $P_{GRID}$ to provide an indication of the power $P_{GRID}$ to each of the other site controller(s) 120. Similarly, the cross-control signal CCTRL can be provided from the site controller(s) 120 that are monitoring the voltage $V_{BUS}$ to provide an indication of the voltage $V_{BUS}$ to each of the other site controller(s) 120. Therefore, the site controller(s) 120 can be configured to collectively share the monitored power $P_{GRID}$ and monitored voltage $V_{BUS}$.

In the example of FIG. 3, each of the site controllers 120 includes an AVR 122. Based on the power $P_{GRID}$ and the voltage $V_{BUS}$, as shared between the site controller(s) 120 via the cross-control signal CCTRL, the AVR 122 in each of the site controller(s) 120 can generate at least one voltage set-point SET, and to provide the voltage set-point(s) SET to the control processor(s) 112 in each of the feeder groups 108 in the respective wind farm(s) 106. Therefore, each of the control processor(s) 112 can control the wind turbines in a given one of the feeder groups 108 to provide a requisite predetermined voltage $V_{FG}$, such that the feeder groups 108 in each of the wind farms 106 can cooperate to generate the voltage $V_{BUS}$ at the low-side of the GSU transformer 116 to regulate the power $P_{GRID}$, or any of the associated power characteristics, to within an acceptable range of values dictated by the standard.

The wind farm power control system 100 that is demonstrated in the example of FIG. 3 thus provides for a similar but more simplified control mechanism than the wind farm power control system 50 in the example of FIG. 2. For example, the wind farm power control system 100 can be quickly and easily implemented, such as to provide for a more cost effective and less labor intensive installation. As another example, the wind farm power control system 100 can be implemented as a relatively simple retrofit for legacy wind farms to provide for voltage mode power management of the power $P_{GRID}$ at the POI 104. While the wind farm power control system 100 is demonstrated as sharing the power $P_{GRID}$ and the voltage VGRID among all of the site controllers 120, it is to be understood that one or more of the site controllers 120 can provide open-loop voltage mode regulation, such as based on only monitoring/receiving information about the power $P_{GRID}$ or the voltage $V_{BUS}$. Accordingly, the wind farm power control system 100 provides another example in which the power $P_{GRID}$ can be regulated to within the predetermined range of amplitudes, such as dictated by the cross-control signal CCTRL, based on voltage mode control of the feeder groups 108 of the wind farms 106.

Figure 4:
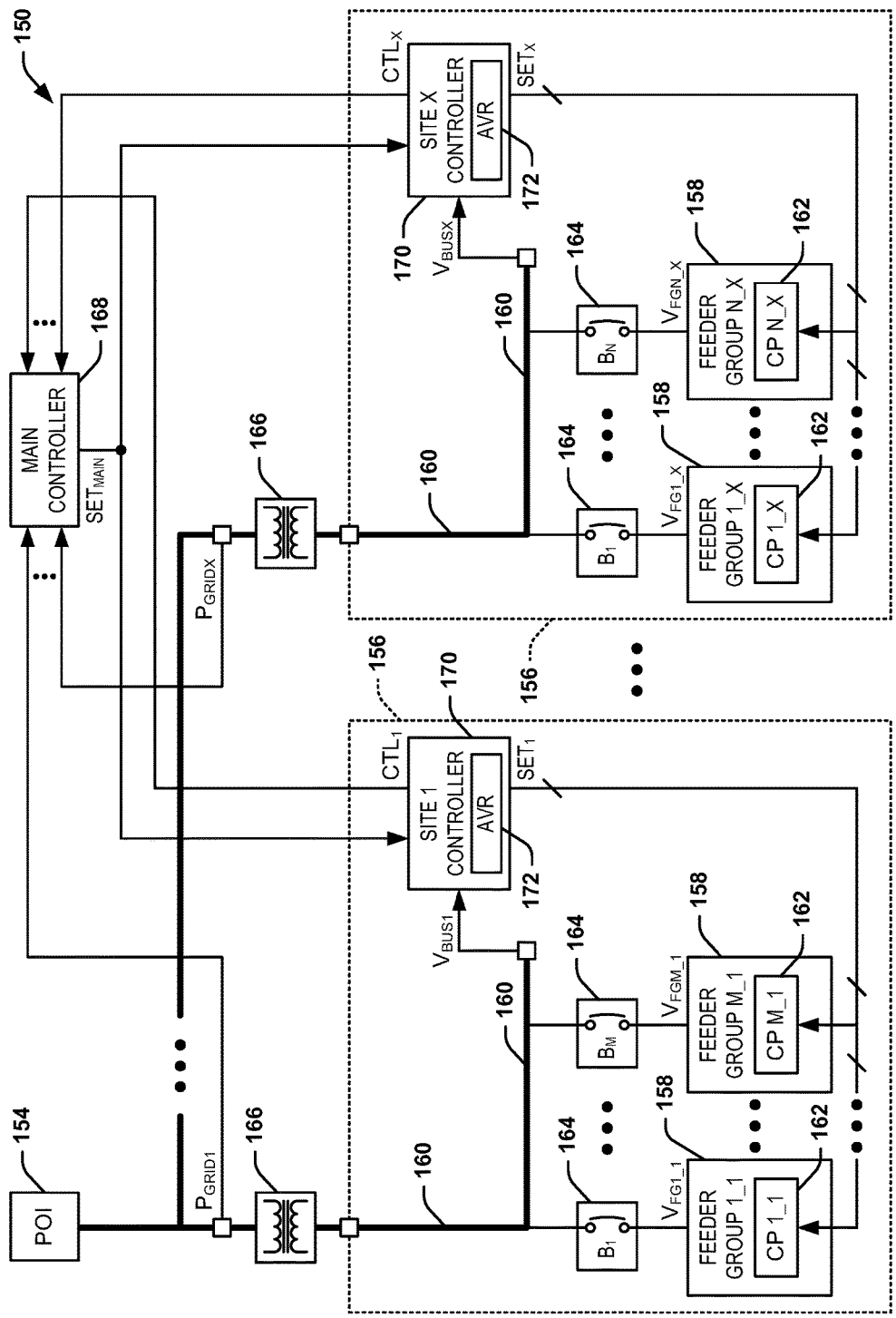
FIG. 4 illustrates a fourth example of a wind farm power control system.

FIG. 4 illustrates a fourth example of a wind farm power control system 150. The wind farm power control system 150 includes a plurality of wind turbines (e.g., similar to the wind turbines 12 in the example of FIG. 1). Each of the wind turbines can be configured to generate electrical power, such as to provide power to a public power grid via a POI 154.

In the example of FIG. 4, the wind farm power control system 150 includes a plurality X of wind farms 156, where X is a positive integer greater than one. Each of the wind farms 156 can be configured substantially similar to the wind farm in the wind farm power control system 10 in the example of FIG. 1. In each of the wind farms 156, the wind turbines are organized into a plurality of feeder groups 158 that collectively provide power onto a respective one of a plurality of power buses 160 that is associated with a respective one of the wind farms 156. In the example of FIG. 4, the wind farms 156 can vary in composition of wind turbines and feeder groups 158 relative to each other, such that a first wind farm 156 includes M feeder groups 158 and the $X^{th}$ wind farm 156 includes N feeder groups, where M and N are positive integers greater than one and not necessarily equal with respect to each other.

In each of the wind farms 156, each of the feeder groups 158 includes at least one control processor 162 that is configured to control the respective feeder group 158 to provide a respective voltage $V_{FG}$, demonstrated as $V_{FG1\_1}$ through $V_{FGM\_1}$ in the first wind farm 156 and $V_{FG1\_X}$ through $V_{FGN\_X}$ in the $X^{th}$ feeder group 158. In the example of FIG. 4, each of the feeder groups 158 are coupled to the respective power bus 160 via a respective plurality of breaker switches 164. The breaker switches 164 can be configured to provide circuit protection, such as to forcibly open in response to excess voltage and/or current, and can be selectively deactivated to provide selective curtailment of the feeder groups 158 in each of the wind farms 156, similar to as described previously.

The power bus 160 is coupled to a low-side of a respective one of a plurality of GSU transformers 166. In the example of FIG. 4, each of the power buses 160 is demonstrated as having a voltage, demonstrated as voltages $V_{BUS1}$ through $V_{BUSX}$, such that each of the GSU transformers 166 is configured to transform the respective one of the voltages $V_{BUS}$ to contribute to a power $P_{GRID}$ at a high-side of each of the GSU transformers 166 that are each coupled to the POI 154, with the power demonstrated as powers $P_{GRID1}$ through $P_{GRIDX}$, such that each of the powers $P_{GRID1}$ through $P_{GRIDX}$ can have separate power characteristics. Therefore, the powers $P_{GRID1}$ through $P_{GRIDX}$ are provided as a collective power source to power customers of the wind farm via the POI 154. Similar to as described previously, the wind farm power control system 150 can be configured to regulate the powers $P_{GRID1}$ through $P_{GRIDX}$. As described herein, the powers $P_{GRID1}$ through $P_{GRIDX}$ are representative of a power characteristic of the high-side of the GSU transformers 166, and thus the POI 154.

In the example of FIG. 4, the wind farm power control system 150 includes a main controller 168 and a plurality of site controllers 170 that are each associated with a respective one of the wind farms 156. The main controller 168 is configured to cooperate with the site controllers 170 to implement the power control methodology described herein. In the example of FIG. 4, the main controller 168 is coupled to the POI 154, and is thus configured to monitor each of the powers $P_{GRID1}$ through $P_{GRIDX}$, while the site controllers 170 are each configured to monitor the respective voltages $V_{BUS1}$ through $V_{BUSX}$ of the power buses 160. The site controllers 170 are also each configured to provide respective control signals, demonstrated as $CTL_1$ through $CTL_X$, to the main controller 168 that can correspond to an amplitude of the respective voltages $V_{BUS1}$ through $V_{BUSX}$, and/or can include characteristics of the receptive wind farm 156. For example, the characteristics of the wind farm 156 can include an indication of how many feeder groups 158 are selectively coupled to the respective power bus 160 via the respective breaker switches 164 and/or the number of wind turbines in the respective feeder groups 158.

In response to the monitoring of the powers $P_{GRID1}$ through $P_{GRIDX}$ and the control signals $CTL_1$ through $CTL_X$, the main controller 168 can be configured to generate a main voltage set-point $SET_{MAIN}$ that is provided to each of the site controllers 170. The main voltage set-point $SET_{MAIN}$ can be associated with a desired amplitude of the voltages $V_{BUS1}$ through $V_{BUSX}$ associated with the respective power buses 160 to maintain the powers $P_{GRID1}$ through $P_{GRIDX}$ and/or an overall power at the POI 154 to within the predetermined range of amplitudes. As an example, the main voltage set-point $SET_{MAIN}$ can correspond to a single voltage set-point for all of the site controllers 170, or can include individual voltage set-points for each of the respective site controllers 170.

In the example of FIG. 4, each of the site controllers 170 includes an AVR 172. Based on the main voltage set-point $SET_{MAIN}$ and the respective one of the voltages $V_{BUS1}$ through $V_{BUSX}$, the AVR 172 is configured to generate at least one voltage set-point SET, and to provide the voltage set-point(s) SET to the control processor(s) 162 in each of the feeder groups 158. Therefore, each of the control processor(s) 162 can control the wind turbines in a given one of the feeder groups 158 to provide a requisite predetermined voltage $V_{FG}$, such that the feeder groups 158 in each of the wind farms 156 can cooperate to generate the respective one of the voltages $V_{BUS1}$ through $V_{BUSX}$ at the low-side of the respective one of the GSU transformers 166 to regulate the respective one of the powers $P_{GRID1}$ through $P_{GRIDX}$, or any of the associated power characteristics, to within an acceptable range of values dictated by the standard.

The wind farm power control system 150 that is demonstrated in the example of FIG. 4 thus provides for a similar control mechanism to the wind farm power control system 50 in the example of FIG. 2. However, the wind farm power control system 150 thus provides a power control management scheme for a wind farm power control system that includes multiple GSU transformers 166. While the example of FIG. 4 demonstrates a single wind farm 156 for each of the respective GSU transformers 166, it is to be understood that there can be multiple wind farms 156 for each of the GSU transformers 166. Therefore, the wind farm power control system 150 can be configured as a combination of the wind farm power control system 50 in the example of FIG. 2 and the wind farm power control system 150, as described herein.

Figure 5:
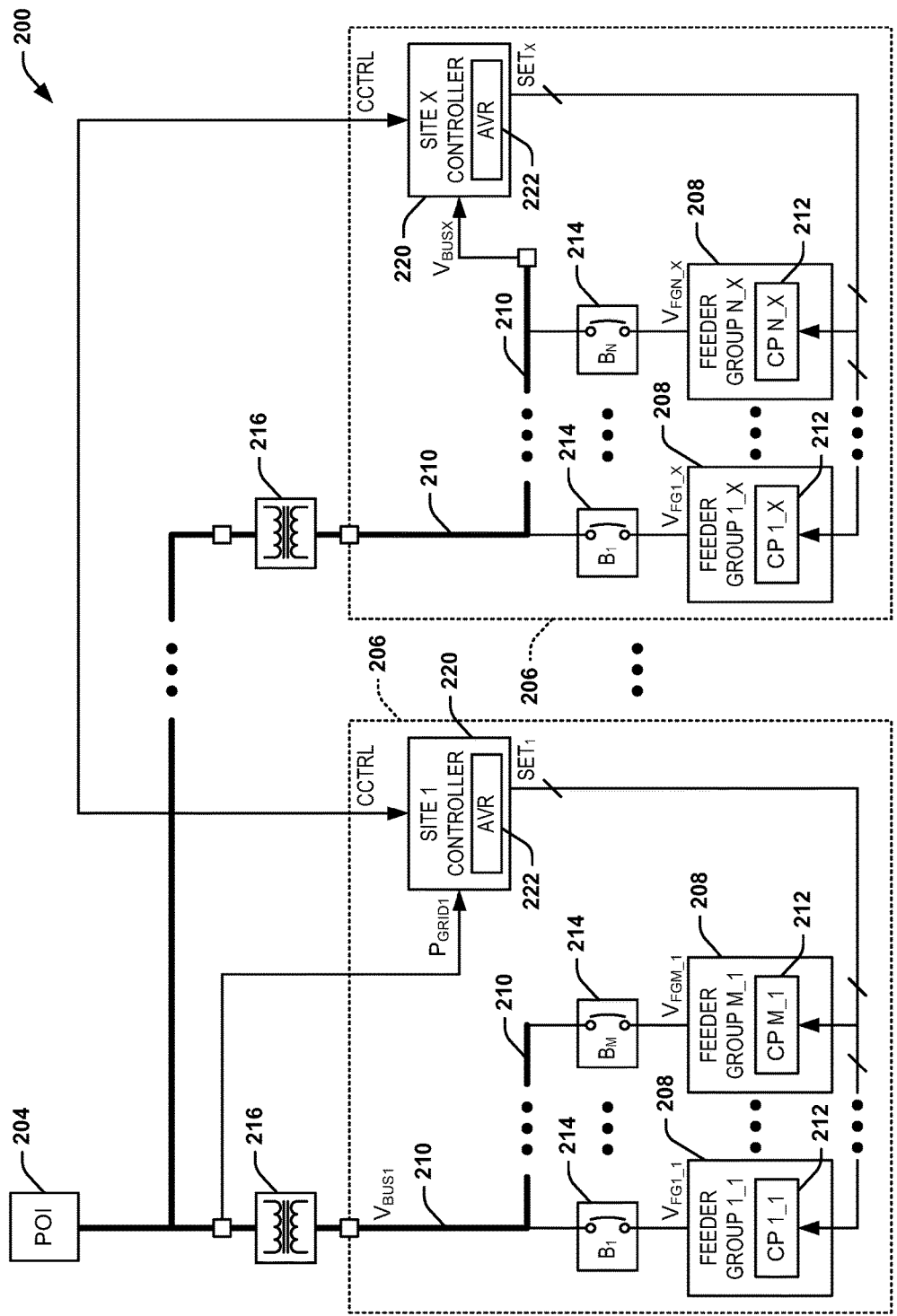
FIG. 5 illustrates a fifth example of a wind farm power control system.

FIG. 5 illustrates a fifth example of a wind farm power control system 200. The wind farm power control system 200 includes a plurality of wind turbines. Each of the wind turbines can be configured to generate wind power, such as to provide power to a public power grid via a POI 204.

In the example of FIG. 5, the wind farm power control system 200 includes a plurality X of wind farms 206, where X is a positive integer greater than one. Each of the wind farms 206 can be configured substantially similar to the wind farm in the wind farm power control system 10 in the example of FIG. 1. In each of the wind farms 206, the wind turbines are organized into a plurality of feeder groups 208 that collectively provide power onto a respective one of a plurality of power buses 210 that is associated with a respective one of the wind farms 206. In the example of FIG. 5, the wind farms 206 can vary in composition of wind turbines and feeder groups 208 relative to each other, such that a first wind farm 206 includes M feeder groups 208 and the $X^{th}$ wind farm 206 includes N feeder groups, where M and N are positive integers greater than one and not necessarily equal with respect to each other.

In each of the wind farms 206, each of the feeder groups 208 includes at least one control processor 212 that is configured to control the respective feeder group 208 to provide a respective voltage $V_{FG}$, demonstrated as $V_{FG1\_1}$ through $V_{FGM\_1}$ in the first wind farm 206 and $V_{FG1\_X}$ through $V_{FGN\_X}$ in the $X^{th}$ feeder group 208. In the example of FIG. 5, each of the feeder groups 208 are coupled to the respective power bus 210 via a respective plurality of breaker switches 214. The breaker switches 214 can be configured to provide circuit protection, such as to forcibly open in response to excess voltage and/or current, and can be selectively deactivated to provide selective curtailment of the feeder groups 208 in each of the wind farms 206, similar to as described previously.

The power bus 210 is coupled to a low-side of a respective one of a plurality of GSU transformers 216. In the example of FIG. 5, each of the power buses 210 is demonstrated as having a voltage, demonstrated as voltages $V_{BUS1}$ through $V_{BUSX}$, such that each of the GSU transformers 216 is configured to transform the respective one of the voltages $V_{BUS}$ to contribute to a power $P_{GRID}$ at a high-side of each of the GSU transformers 216 that are each coupled to the POI 204, with the power demonstrated as powers $P_{GRID1}$ through $P_{GRIDX}$, such that each of the powers $P_{GRID1}$ through $P_{GRIDX}$ can have separate power characteristics. Therefore, the powers $P_{GRID1}$ through $P_{GRIDX}$ are provided as a collective power source to power customers of the wind farm via the POI 204. Similar to as described previously, the wind farm power control system 200 can be configured to regulate the powers $P_{GRID1}$ through $P_{GRIDX}$. As described herein, the powers $P_{GRID1}$ through $P_{GRIDX}$ are representative of a power characteristic of the high-side of the GSU transformers 216, and thus the POI 204.

In the example of FIG. 5, the wind farm power control system 200 includes a plurality of site controllers 220 that are each associated with a respective one of the wind farms 206. The site controllers 220 are configured to cooperatively implement the power control methodology described herein. For example, the site controllers 220 can each be configured as RTUs, or as one of the control processor(s) 212. In the example of FIG. 5, at least one of the site controllers 220, demonstrated as at least the first site controller 220, associated with a respective at least one of the wind farms 206 is coupled to the POI 204, and is thus configured to monitor one of the powers, demonstrated as the power $P_{GRID1}$. Additionally, the site controllers 120 associated with the remaining wind farm(s) 120 are each configured to monitor a respective one of the voltages, demonstrated as the voltage $V_{BUSX}$, of a respective one of the power buses 210.

The site controller(s) 220 are demonstrated as being configured to generate a cross-control signal CCTRL that is provided to each of the other site controller(s) 220. The cross-control signal CCTRL can be provided from the site controller(s) 220 that are monitoring one or more of the powers $P_{GRID1}$ through $P_{GRIDX}$ to provide an indication of the respective powers $P_{GRID1}$ through $P_{GRIDX}$ to each of the other site controller(s) 120. Similarly, the cross-control signal CCTRL can be provided from the site controller(s) 120 that are monitoring the respective one of the voltages $V_{BUS1}$ through $V_{BUSX}$ to provide an indication of the respective voltages $V_{BUS1}$ through $V_{BUSX}$ to each of the other site controller(s) 120. Therefore, the site controller(s)

120 can be configured to collectively share the monitored powers $P_{GRID1}$ through $P_{GRIDX}$ and monitored voltages $V_{BUS1}$ through $V_{BUSX}$.

In the example of FIG. 5, each of the site controllers 220 includes an AVR 222. Based on the powers $P_{GRID1}$ through $P_{GRIDX}$ and the voltages $V_{BUS1}$ through $V_{BUSX}$, as shared between the site controller(s) 120 via the cross-control signal CCTRL, the AVR 222 in each of the site controller(s) 220 can generate at least one voltage set-point SET, and to provide the voltage set-point(s) SET to the control processor(s) 212 in each of the feeder groups 208 in the respective wind farm(s) 206. Therefore, each of the control processor(s) 212 can control the wind turbines in a given one of the feeder groups 208 to provide a requisite predetermined voltage $V_{FG}$, such that the feeder groups 208 in each of the wind farms 206 can cooperate to generate the voltages $V_{BUS1}$ through $V_{BUSX}$ at the respective low-sides of the GSU transformers 216 to regulate the respective powers $P_{GRID1}$ through $P_{GRIDX}$, and thus the power at the POI 204, or any of the associated power characteristics, to within an acceptable range of values dictated by the standard.

The wind farm power control system 200 that is demonstrated in the example of FIG. 5 thus provides for a similar but more simplified control mechanism than the wind farm power control system 150 in the example of FIG. 4. For example, the wind farm power control system 200 can be quickly and easily implemented, such as to provide for a more cost effective and less labor intensive installation. As another example, the wind farm power control system 200 can be implemented as a relatively simple retrofit for legacy wind farms to provide for voltage mode power management of the power at the POI 204. While the wind farm power control system 200 is demonstrated as sharing the powers $P_{GRID1}$ through $P_{GRIDX}$ and the voltage VGRID among all of the site controllers 220, it is to be understood that one or more of the site controllers 220 can provide open-loop voltage mode regulation, such as based on only monitoring/receiving information about the powers $P_{GRID1}$ through $P_{GRIDX}$ or the voltages $V_{BUS1}$ through $V_{BUSX}$. Accordingly, the wind farm power control system 200 provides another example in which the powers $P_{GRID1}$ through $P_{GRIDX}$ can be regulated to within the predetermined range of amplitudes, such as dictated by the cross-control signal CCTRL, based on voltage mode control of the feeder groups 208 of the wind farms 206.

Figure 6:
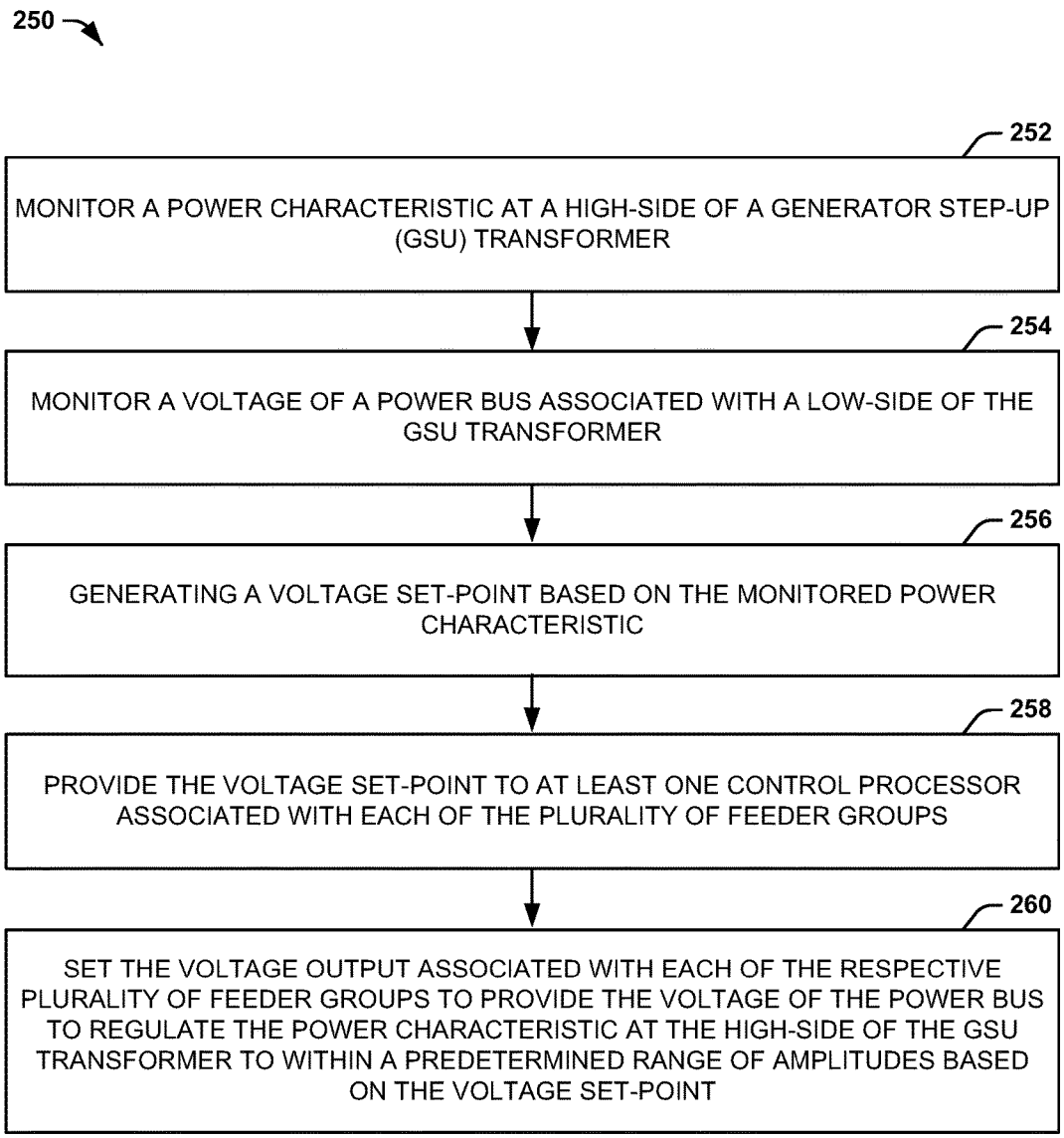
FIG. 6 illustrates a method for regulating power in a wind farm.

In view of the foregoing structural and functional features described above, methods in accordance with various aspects of the present disclosure will be better appreciated with reference to FIG. 6. While, for purposes of simplicity of explanation, the method of FIG. 6 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 6 illustrates a method 250 for regulating power in a wind farm (e.g., in the wind farm power control system 10). At 252, a power characteristic (e.g., the power $P_{GRID}$) is monitored at a high-side of a GSU transformer (e.g., the GSU transformer 24). The high-side of the GSU transformer can be coupled to a POI (e.g., the POI 14) that provides power from the wind farm to a power grid. At 254, a voltage (e.g., the voltage $V_{BUS}$) of a power bus (e.g., the power bus 18) associated with a low-side of the GSU transformer is monitored. The power bus can be provided power from a voltage output (e.g., the voltages $V_{FG}$) of each of a plurality of feeder groups (e.g., the feeder groups 16). Each of the plurality of feeder groups can include a plurality of wind turbines (e.g., the wind turbines 12). At 256, a voltage set-point (e.g., the signal SET) is generated based on the monitored power characteristic. At 258, the voltage set-point is provided to at least one control processor (e.g., the control processor(s) 20) associated with each of the plurality of feeder groups. The at least one control processor can be configured to regulate a voltage output associated with the respective one of the plurality of feeder groups. At 260, the voltage output associated with each of the respective plurality of feeder groups is set to provide the voltage of the power bus to regulate the power characteristic at the high-side of the GSU transformer to within a predetermined range of amplitudes based on the voltage set-point.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A wind farm power control system comprising:
a first site controller configured to monitor a power characteristic at a high-side of a generator step-up (GSU) transformer, the high-side of the GSU transformer being coupled to a point-of-interconnect (POI) that provides power from a wind farm to a power grid, the first site controller comprising a single first automatic voltage regulator (AVR) per a plurality of first feeder groups, each of the plurality of first feeder groups comprising a plurality of first wind turbines; and
a second site controller comprising a single second automatic voltage regulator (AVR) per a plurality of second feeder groups configured to monitor a voltage of a power bus associated with a low-side of the GSU transformer, the power bus being provided power from the plurality of second feeder groups, each of the plurality of second feeder groups comprising a plurality of second wind turbines,
wherein the first site controller generates a cross-control signal directly provided to the second site controller to provide an indication of the power characteristic to the second site controller,
wherein the second site controller generates a cross-control signal directly provided to the first site controller to provide an indication of the voltage on the power bus, and
wherein the first AVR is further configured to regulate the power characteristic at the high-side of the GSU transformer to within a predetermined range of amplitudes based on the voltage of the power bus.

2. The system of claim 1, wherein the first AVR is configured to generate a voltage set-point based on the monitored power characteristic and to provide the voltage set-point to at least one control processor associated with each of the plurality of first feeder groups and the plurality of second feeder groups, the at least one control processor being configured to regulate a voltage output associated with the respective one of the plurality of first feeder groups and the plurality of second feeder groups, wherein the first AVR and the second AVR are configured to set the voltage output associated with each of the respective plurality of first feeder groups and the plurality of second feeder groups to regulate the power characteristic at the high-side of the GSU transformer to within the predetermined range of amplitudes based on the voltage set-point.

3. The system of claim 2, wherein the wind farm comprises a plurality of breaker switches that interconnect the respective plurality of first feeder groups and the plurality of second feeder groups to the power bus, wherein the first AVR is configured to determine the voltage set-point based on a number of the plurality of first feeder groups and the plurality of second feeder groups that are coupled to the power bus via a respective number of the plurality of breaker switches, and is configured to provide the voltage set-point to the at least one control processor associated with each of the plurality of first feeder groups and the plurality of second feeder groups that are coupled to the power bus via the respective plurality of breaker switches.

4. The system of claim 1, wherein the first site controller is configured to monitor a reactive power associated with the high-side of the GSU transformer, such that the first AVR is configured to regulate the reactive power at the high-side of the GSU transformer to within the predetermined range of amplitudes.

5. A method for regulating power in a wind farm, the method comprising:
monitoring a power characteristic at a high-side of a generator step-up (GSU) transformer with a first site controller, the first site controller comprising a single first automatic voltage regulator (AVR) per a plurality of first feeder groups, the high-side of the GSU transformer being coupled to a point-of-interconnect (POI) that provides power from the wind farm to a power grid, each of the plurality of first feeder groups comprising a plurality of first wind turbines;
monitoring a voltage of a power bus associated with a low-side of the GSU transformer with a second site controller, the second site controller comprising a single second automatic voltage regulator (AVR) per a plurality of second feeder groups, the power bus being provided power from a voltage output of each of the plurality of feeder groups, each of the plurality of second feeder groups comprising a plurality of second wind turbines;
generating via the first AVR a voltage set-point based on the monitored power characteristic and directly providing the voltage set-point to the second site controller via a cross-control signal;
providing, via the first AVR, the voltage set-point to at least one first control processor associated with the plurality of first feeder groups configured to regulate a voltage output associated with the first feeder groups;
providing, via the second AVR, the voltage set-point to at least one second control processor being configured to regulate a voltage output associated with the plurality of second feeder groups; and
setting via the first AVR and the second AVR the voltage output associated with each of the respective plurality of first feeder groups and the respective plurality of second feeder groups to provide the voltage of the power bus to regulate the power characteristic at the high-side of the GSU transformer to within a predetermined range of amplitudes based on the voltage set-point.

6. The method of claim 5, further comprising selectively activating a plurality of breaker switches that interconnect the respective plurality of first feeder groups and the plurality of second feeder groups to the power bus, wherein generating via the first AVR the voltage set-point comprises generating via the first AVR the voltage set-point based on a number of the plurality of first feeder groups and the plurality of second feeder groups that are coupled to the power bus via the selective activation of a respective number of the plurality of breaker switches, wherein providing via the first AVR the voltage set-point comprises providing via the first AVR the voltage set-point to each of the plurality of first feeder groups and the plurality of second feeder groups that are coupled to the power bus via the respective plurality of breaker switches.

7. The method of claim 5, wherein monitoring the voltage of the power bus comprises monitoring via the second AVR the voltage of the power bus that is provided from each the plurality of second feeder groups,
wherein providing via the first AVR the voltage set-point comprises providing via the first AVR the voltage set-point to each of the at least one control processor associated with the respective first and second pluralities of feeder groups, and
wherein setting via the first AVR the voltage output comprises setting via the first AVR the voltage output associated with the first plurality of feeder groups and the second plurality of feeder groups to provide the voltage of the power bus to cooperatively regulate the power characteristic at the high-side of the GSU transformer to within the predetermined range of amplitudes based on the voltage set-point.

8. The method of claim 5, wherein monitoring the voltage of the power bus comprises monitoring via the second AVR the voltage of the power bus that is provided from each of the plurality of second feeder groups,
wherein generating via the first AVR the voltage set-point comprises generating via the first AVR the voltage set-point at the first site controller associated with the plurality of first feeder groups based on the monitored power characteristic,
wherein providing via the first AVR the voltage set-point comprises:
providing via the first AVR the voltage set-point to the second site controller associated with the plurality of second feeder groups;
providing via the first AVR the voltage set-point to the at least one control processor associated with the plurality of first feeder groups; and
providing via the first AVR the voltage set-point to the at least one control processor associated with the plurality of second feeder groups,
wherein setting via the AVR the voltage output comprises setting via the second AVR the voltage output associated with the plurality of first feeder groups and the plurality of second feeder groups to provide the voltage of the power bus to cooperatively regulate the power characteristic at the high-side of the GSU transformer to within the predetermined range of amplitudes based on the voltage set-point.

9. The method of claim 5, wherein monitoring via the second AVR the voltage of the power bus comprises monitoring via the second AVR the voltage of a first power bus that is provided from each of the plurality of first feeder groups and that is associated with a low-side of a first GSU transformer, and monitoring via the second AVR the voltage of second power bus that is provided from each of the plurality of second feeder groups and that is associated with a low-side of a second GSU transformer, wherein providing via the first AVR the voltage set-point comprises providing via the first AVR the voltage set-point to each of the at least one control processor associated with the respective pluralities of first and second feeder groups, and wherein setting via the first AVR and the second AVR the voltage output comprises setting via the first AVR and the second the voltage output associated with the plurality of first feeder groups and the plurality of second feeder groups to provide the voltage of the power bus to cooperatively regulate the power characteristic at the coupled high-side of the first and second GSU transformers to within the predetermined range of amplitudes based on the voltage set-point.

10. The method of claim 5, wherein monitoring via the second AVR the voltage of the power bus comprises monitoring via the second AVR the voltage of a first power bus that is provided from the plurality of first feeder groups and that is associated with a low-side of a first GSU transformer, and monitoring via the second AVR the voltage of a second power bus that is provided from the plurality of second feeder groups and that is associated with a low-side of a second GSU transformer, wherein providing via the first AVR the voltage set-point comprises:

providing via the first AVR the voltage set-point to the second site controller associated with the second plurality of feeder groups;

providing via the first AVR the voltage set-point to the at least one control processor associated with the plurality of first feeder groups; and providing via the first AVR the voltage set-point to the at least one control processor associated with the plurality of second feeder groups, wherein setting via the first AVR and the second AVR the voltage output comprises setting via the first AVR and the second AVR the voltage output associated with the plurality of first feeder groups and the plurality of second feeder groups to provide the voltage of the power bus to cooperatively regulate the power characteristic at the coupled high-side of the first and second GSU transformers to within the predetermined range of amplitudes based on the voltage set-point.

11. A wind farm power control system comprising:

a first site controller configured to monitor a power characteristic at a high-side of a generator step-up (GSU) transformer, the high-side of the GSU transformer being coupled to a point-of-interconnect (POI) that provides power from the wind farm to a power grid, the first site controller comprising a single automatic voltage regulator (AVR) per a plurality of first feeder groups;

a plurality of first breaker switches configured to interconnect the plurality of first feeder groups to a power bus associated with a low-side of the GSU transformer, each of the plurality of first feeder groups comprising a plurality of first wind turbines;

a second site controller, the second site controller comprising a single second automatic voltage regulator (AVR) per a plurality of second feeder groups configured to monitor a voltage of the power bus that is provided power from the plurality of first and second feeder groups; and a plurality of second breaker switches configured to interconnect the plurality of second feeder groups to a power bus associated with a low-side of the GSU transformer, each of the plurality of second feeder groups comprising a plurality of second wind turbines, wherein the first site controller generates a cross-control signal and directly provides the cross-control signal to the second site controller to provide an indication of the power characteristic to the second site controller, wherein the second site controller generates a cross-control signal directly provided to the first site controller to provide an indication of the voltage on the power bus, and wherein the first AVR being further configured to generate a voltage set-point based on the voltage of the power bus and based on a number of the plurality of first and second feeder groups that are coupled to the power bus via a respective number of the plurality of first and second breaker switches, and to regulate the power characteristic at the high-side of the GSU transformer to within a predetermined range of amplitudes based on the voltage set-point.

12. The system of claim 11, wherein the first AVR is configured to provide the voltage set-point to at least one control processor associated with each of the plurality of first and second feeder groups, the at least one control processor being configured to regulate a voltage output associated with the respective one of the plurality of first and second feeder groups, wherein the first AVR is configured to set the voltage output associated with each of the respective plurality of first and second feeder groups to regulate the power characteristic at the high-side of the GSU transformer to within the predetermined range of amplitudes based on the voltage set-point.

* * * * *